(12) United States Patent
Baker (10) Patent No.: US 8,172,551 B2
(45) Date of Patent: May 8, 2012

(54) VARIABLE ACTUATION PRESSURE SYSTEM FOR INDEPENDENT PRESSURE CONTROL

(75) Inventor: Carthel C. Baker, Oregon, IL (US)

(73) Assignee: Woodward, Inc., Fort Collins, CO (US)

( * ) Notice: Subject to any disclaimer, the term of this patent is extended or adjusted under 35 U.S.C. 154(b) by 734 days.

(21) Appl. No.: 12/410,607

(22) Filed: Mar. 25, 2009

(65) Prior Publication Data

US 2010/0242431 A1  Sep. 30, 2010

(51) Int. Cl.
*F04B 49/03* (2006.01)
*F04B 49/00* (2006.01)

(52) U.S. Cl. .......................... 417/213; 417/2

(58) Field of Classification Search ............ 417/2, 213; 60/629, 734, 39.01, 772, 773, 39.281
See application file for complete search history.

(56) References Cited

U.S. PATENT DOCUMENTS

| | | | |
|---|---|---|---|
| 4,899,535 A | | 2/1990 | Dehan et al. |
| 5,715,674 A | * | 2/1998 | Reuter et al. ............ 60/39.281 |
| 6,651,441 B2 | | 11/2003 | Reuter et al. |
| 2002/0066266 A1 | * | 6/2002 | Maker et al. ............ 60/39.281 |
| 2003/0136103 A1 | | 7/2003 | Reuter et al. |

FOREIGN PATENT DOCUMENTS

| | | |
|---|---|---|
| DE | 195 18 634 A2 | 10/1995 |
| EP | 0 886 054 A2 | 12/1998 |
| WO | WO 2007044020 A2 * | 4/2007 |

OTHER PUBLICATIONS

U.S. Appl. No. 12/251,930, filed Oct. 15, 2008, Baker.
U.S. Appl. No. 12/252,006, filed Oct. 15, 2008, Baker et al.

* cited by examiner

*Primary Examiner* — Joseph L Williams
*Assistant Examiner* — Nathaniel Lee
(74) *Attorney, Agent, or Firm* — Reinhart Boerner Van Deuren P.C.

(57) ABSTRACT

A pump arrangement and method of regulating pressure of a pump arrangement are provided. The pump arrangement includes an actuation pump, a pressure regulating valve, and a control valve. The actuation pump has an actuation pump outlet providing an actuation pump discharge flow. The actuation pump discharge flow is piped to opposite sides of a regulator valve member that selectively adjusts an amount of fluid that is bled from the actuation pump outlet such that the actuation pump outlet pressure is used to regulate the actuation pump discharge pressure. The actuation pump discharge flow is separated into first and second portions to provide opposing forces on the regulator valve member. The control valve is operably interposed between the actuation pump outlet and the valve member to selectively adjusts the amount of biasing applied by the second portion of the actuation pump discharge flow on the regulator valve member.

24 Claims, 6 Drawing Sheets

VARIABLE ACTUATION PRESSURE SYSTEM FOR INDEPENDENT PRESSURE CONTROL

FIELD OF THE INVENTION

This invention generally relates to fuel delivery systems for gas turbine engines and more particularly to duel pump fuel systems for gas turbine engine applications.

BACKGROUND OF THE INVENTION

In aviation applications, fuel delivery systems for gas turbine engines typically utilize high pressure, positive displacement pumps to supply high pressure fuel to the engines which power the aircraft. In addition, the high pressure fuel system is often utilized as a source of high pressure fluid for the hydraulic systems and servos which position actuators that control the engine or other aspects of the aircraft.

The fuel pump is typically driven by the turbine engine through a gearbox. The pump flow rate is thus proportional to engine speed. The main fuel supply pump is sized to supply enough fuel to the engine during windmill start conditions, which are typically about 6 to 10% above normal cruising speed, and/or during maximum power conditions. Accordingly, at many engine operating conditions, the engine flow demand is significantly less than the high pressure flow supplied by the main pump. The excess high pressure pump flow is typically bypassed back to the low pressure inlet of the pump. Raising the pressure of the excess flow and returning the excess flow back to low pressure is effectively wasted energy. This energy is realized as heat input into the fuel and results in undesirable higher fuel temperatures and also requires the addition of large heat exchangers for removing the excess heat from the fuel There have now been attempts to generate fuel delivery systems that include two separate pumps for pumping fuel. One pump, often referred to as a main pump or a main metering pump, provides fuel to the engine during normal operating conditions. The other pump, often referred to as an actuation pump, supplies fluid to various actuators throughout the aircraft.

To avoid over sizing the main pump for the majority of its operating conditions, the main pump may be sized to supply fuel at a rate less than which may be required during relight operations or other high flow demand situations. Thus, some fuel delivery systems have been implemented that provide flow sharing that couple the actuation pump to the main pump such that the actuation pump can supplement the fuel supplied to the turbine engine during these high fuel demand situations.

In these situations, the discharge pressure of the actuation pump must be at or above the discharge pressure of the main pump to avoid the effects of system transients. Thus, the discharge pressure of the main pump can be used to regulate the discharge pressure of the actuation pump. However, the applicants have determined that it can be problematic to use the discharge pressure of the main pump for regulating the discharge pressure of the actuation pump at all times. More particularly, to accurately control the discharge pressure of the actuation pump using the discharge pressure of the main pump requires that the parameters needed to determine the main pump discharge pressure be known. However, these parameters may include engine speed, CDP, and flow split. Further, as the discharge pressures of the actuation pump must be increased near the main pump must discharge pressure to minimize switching transient. This requires that the parameters need to anticipate when the flow sharing will occur.

There is therefore a need for a fuel supply system where the discharge pressure of the actuation pump is independent of external parameters during normal operation, but can be overridden when entering a flow sharing mode.

BRIEF SUMMARY OF THE INVENTION

Embodiments of the invention provide new and improved pump arrangements and method of regulating outlet pressure of pumps within fuel systems. More particularly, embodiments of the invention provide new and improved fuel pump arrangements having actuation pumps and methods of regulating outlet pressure of actuation pumps within fuel systems. Further yet, embodiments of the invention provide new and improved fuel pump arrangements that have actuation pumps that utilize outlet flow from the actuation pump to self regulate the outlet pressure of the actuation pump as well as methods of using the outlet pressure of an actuation pump to regulate the outlet pressure of the actuation pump within a fuel system.

In accord with the invention, various ones of the embodiments allow for output pressure regulation without relying on reference pressures provided by other high pressure pumps within the fuel system, such as main pump outlet pressure, during normal operation of the actuation pump. This arrangement reduces the need to determine external factors such as engine speed, CDP and flow split of the main pump.

In one embodiment of the invention, a pump arrangement for a fuel system for use in an aircraft is provided. The pump arrangement includes an actuation pump, a pressure regulating valve, and a control valve. The actuation pump has an actuation pump outlet providing an actuation pump discharge flow. The pressure regulating valve includes first, second and third ports. The pressure regulating valve includes a regulator valve member selectively adjusting fluid flow (flow rate, pressure or both) from the first port to the second port. Further, the first port is fluidly coupled to the actuation pump outlet such that a first portion of the actuation pump discharge flow operably biases the regulator valve member in a first direction. The third port is fluidly coupled to the actuation pump outlet such that a second portion of the actuation pump discharge flow operably biases the regulator valve member in a second direction opposite the first direction. Therefore, the first and second portions of the actuation pump discharge flow provide opposing forces on the regulator valve member. The control valve is operably interposed between the actuation pump outlet and the third port and selectively adjusts the amount of biasing applied by the second portion of the actuation pump discharge flow on the regulator valve member.

In this arrangement, the second portion of the actuation pump discharge flow can be bled away from the regulator valve member to adjust the amount of pressure (and force) it applies to the regulator valve member. The less force applied to the valve member by the second portion of actuation pump discharge flow to the regulator valve member results in causing the regulator valve member to increase the size of the flow passage from the first port to the second port to decrease the flow restriction therebetween as a constant amount of flow is trying to pass through a larger passage. This operatively causes the actuation pump discharge pressure to drop. The opposite is true as well. When it is desired to increase actuation pump discharge pressure, more force is applied to the valve member by the second portion of actuation pump discharge flow to force the valve member to reduce the size of the flow passage from the first port to the second port to increase the flow restriction therebetween. This operatively causes the actuation pump discharge pressure to increase as a constant amount of flow is trying to pass through a smaller passage.

In a preferred embodiment, the control valve includes a control valve inlet operably fluidly communicating with the third port of the pressure regulating valve and a control valve outlet operably fluidly communicating with a control pressure source. The control valve includes a control valve member interposed between the control valve inlet and the control valve outlet to adjust the amount of the second portion of the actuation pump discharge flow that is permitted to flow to the control pressure source to adjust the amount of biasing applied by the second portion of the actuation pump discharge flow.

To increase the amount of biasing applied to the regulator valve member in the second direction (i.e. to drive toward a higher actuation pump discharge pressure), the control valve reduces the amount of fluid that is permitted to flow to the control pressure source. To decrease the amount of biasing applied to the regulator valve member in the second direction (i.e. to drive toward a lower actuation pump discharge pressure), the control valve increases the amount of fluid that is permitted to flow therethrough (i.e. to be bled away from the regulator valve member) and to the control pressure source.

In one particular embodiment, the control pressure source is or switchable to a low pressure source.

In a highly preferred embodiment of the pump arrangement, the pump arrangement further includes a sharing valve and a main pump. The sharing valve is operably fluidly coupled to the actuation pump outlet. The main pump has a main pump outlet fluidly coupled to the sharing valve. The sharing valve is the control pressure source and is switchable between first and second pressure regulating configurations. The first pressure regulating configuration operably fluidly couples the control valve outlet to a low pressure source so as to permit flow from the control valve inlet to the control valve outlet (i.e. to permit bleeding off of the second portion of the actuation pump discharge flow). The second pressure regulating configuration operably fluidly couples the control valve outlet to the main pump outlet, which has a high pressure. In this arrangement, a desired minimum pressure (which is actually a high pressure) is applied to the regulator valve member to bias the regulator valve member in the second direction. This causes the regulator valve member to maintain the actuation pump discharge pressure at or above a desired high pressure.

This is particularly beneficial in a preferred embodiment, where the sharing valve is a flow sharing valve that has a first flow sharing configuration wherein the sharing valve operably combines the actuation pump discharge flow with a main pump discharge flow to provide a combined flow and a second flow sharing configuration wherein the sharing valve operably isolates the actuation pump discharge flow from the main pump discharge flow. The combined flow condition is typically used during high fuel demands that cannot be met solely by the main pump. Preferably, when the sharing valve is in the second pressure regulating configuration when the sharing valve is in the first flow sharing configuration. In this arrangement, when flow sharing occurs, the actuation pump discharge pressure is not allowed to drop below the main pump discharge pressure. This prevents the system from going transient when the two different flows are combined using the flow sharing valve.

In preferred embodiments, the first portion of the actuation pump discharge flow acts on a first portion of the regulator valve member having a first effective surface area that is greater than a second effective surface area of a second portion of the regulator valve member upon which the second portion of the actuation pump discharge flow acts. This arrangement causes a force imbalance toward opening the flow path between the first and second ports. This prevents the regulator valve member from driving the flow path between the first and second ports closed continuously and allowing the actuation pump discharge pressure from going toward infinite and destroying the fuel system. It should be noted that in some embodiments, the differential area between the first and second effective surface areas may be acted upon by a low pressure fluid which must be accounted for in the force balance.

Typically, this type of an arrangement will include a biasing member, such as a coil spring, that cooperates with the second portion of the actuation pump discharge flow to drive the regulator valve member in the second direction. The biasing member can be configured to provide a force equal to the percentage difference in the first and second effective areas multiplied by the desired maximum actuation pump discharge pressure so as to allow the valve member to attain a steady state value proximate the desired maximum actuation pump discharge pressure. In one embodiment, the first effective surface area is between about five percent and fifteen percent greater than the second effective area and further comprising a biasing member acting on the regulator valve member in the second direction and consequently the biasing member provides a biasing force of between about five percent and fifteen percent of a maximum actuation pump discharge pressure. This may be compensated depending on the presence of any force generated by a low pressure fluid acting on the differential area noted above.

Embodiments of the methods provide a method of regulating an actuation pump discharge pressure of an actuation pump in a fuel system in an aircraft. These methods use the actuation pumps own discharge pressure for regulation of the actuation pump discharge pressure. The method comprises the steps of biasing a valve member in a first direction using the actuation pump discharge pressure of an actuation pump by applying the actuation pump discharge pressure to a first portion of the valve member; biasing the valve member in a second direction, opposite the first direction, using the discharge pressure of the actuation pump by applying the discharge pressure to a second portion of the valve member; and selectively adjusting the amount of the actuation pump discharge pressure applied to the second portion of the valve member. By adjusting the amount of actuation pump discharge pressure applied to the second portion of the valve member the force balance on the valve member can be manipulated to adjust the position of the valve member and to thereby adjust the actuation pump discharge pressure. Transitioning of the valve member in the first direction reduces actuation pump discharge pressure and transitioning of the valve member in the second direction increases actuation pump discharge pressure.

In a preferred method, the step of biasing in the first direction includes operatively applying a first portion of an actuation pump discharge flow to the first portion of the valve member. The step of biasing in the second direction includes operatively applying a second portion of the actuation pump discharge flow to the second portion of the valve member. The step of selectively adjusting the amount of the actuation pump discharge pressure applied to the second portion of the valve member includes selectively adjusting a reference pressure applied to the second portion of the actuation pump discharge flow that biases the second portion of the valve member.

In a further preferred method, transitioning the valve member in the first direction increasingly opens or increases the size of a flow path between the actuation pump discharge and a low pressure source decreasing the amount of flow restriction on the actuation pump discharge flow that passes therethrough thereby reducing the actuation pump discharge pressure. Transitioning the valve member in the second direction increasingly closes or decreases the size of the flow path between the actuation pump discharge and the low pressure source increasing the amount of flow restriction on the actuation pump discharge flow that passes therethrough thereby increasing the actuation pump discharge pressure.

In one implementation of the method, the step of adjusting the reference pressure applied to the second portion of the actuation pump discharge flow includes the step of switching between a low pressure source and a high pressure source at a main pump discharge pressure.

Further embodiments of methods according to the present invention include the step of adjusting the reference pressure by bleeding off a portion of the second portion of the actuation pump discharge flow to a low pressure source. Additionally, methods may include, such as in flow sharing arrangements, over-riding the low pressure source with a high pressure source to prevent bleeding off of the second portion of the actuation pump discharge flow to a pressure below the pressure of the high pressure source, particularly when entering flow sharing mode so as to drive the actuation pump discharge pressure toward the high pressure source, which is typically the discharge pressure of the main pump.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
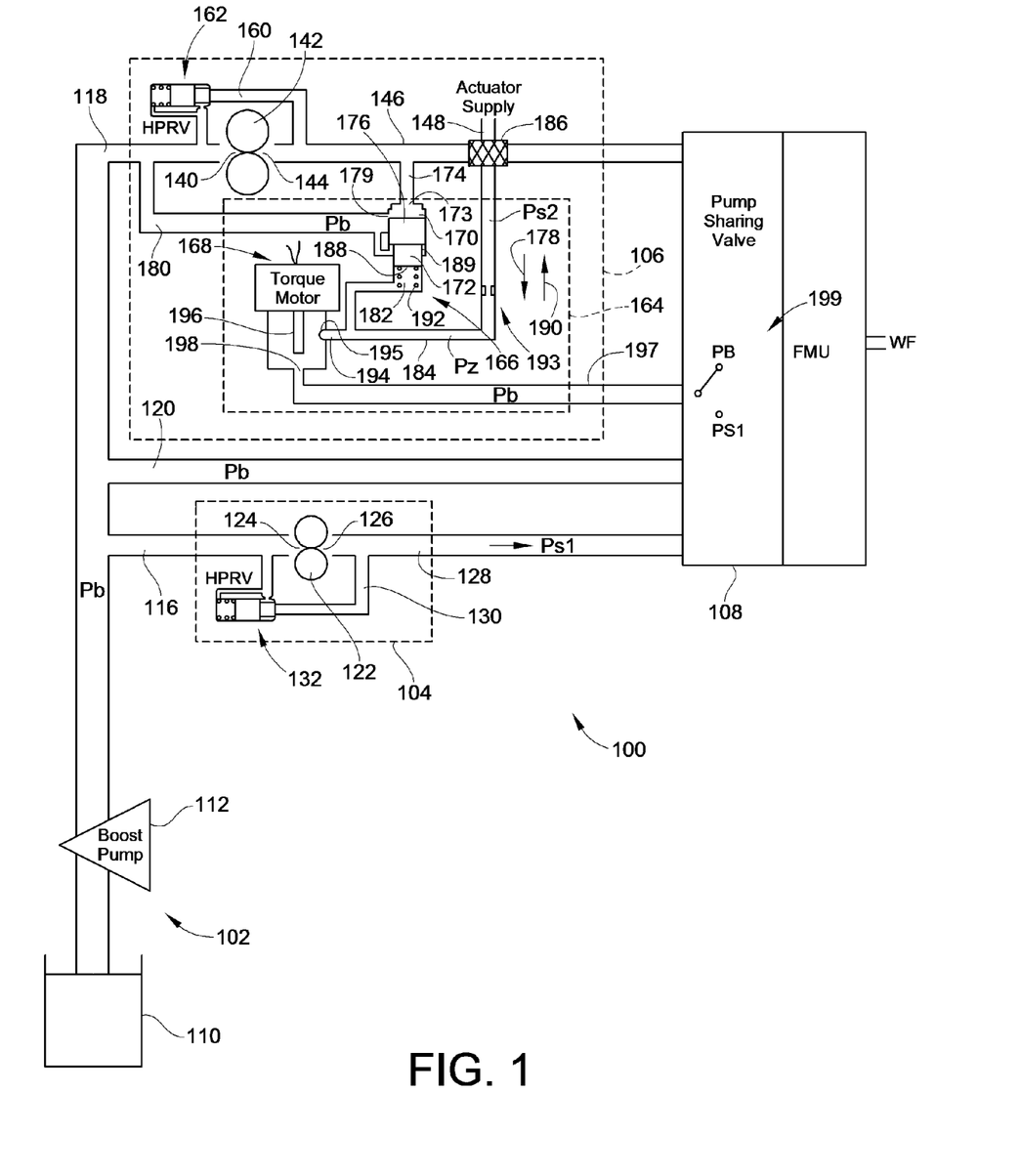
FIG. 1 is a simplified schematic representation of a fuel pump arrangement according to an embodiment of the present invention illustrated in a flow isolation mode.

An exemplary embodiment of a pump arrangement 100 of the present invention is illustrated in FIG. 1. The pump arrangement 100 is preferably a fuel pump arrangement forming part of a fuel supply system and includes a fuel supply, indicated generally at 102, a main fuel supply loop, indicated generally at 104, for providing fuel to an engine during normal or steady state operating conditions, an actuation supply loop, indicated generally at 106, for providing high pressure fluid to auxiliary engine components, and a pump flow sharing system, indicated generally at 108, interconnecting the main supply loop 104 and the actuation supply loop 106 to integrate/combine pump flows when required. While each of the main fuel supply loop 104 and actuation supply loop 106 forms a part of a larger fuel pump arrangement 100, each loop 104, 106 may be considered a fuel pump arrangement individually in other embodiments of the present invention. It will be understood that FIG. 1 is a schematic representation of the present invention and illustrates only one example of the configuration of the fuel delivery and control system 100, which can be implemented in any number of ways as will be known to those skilled in the art.

As shown in FIG. 1, the fuel supply 102 preferably includes a fuel tank 110 and a boost pump 112. The boost pump 112 supplies fuel to the main fuel supply loop 104, the actuation supply loop 106, as well as the pump flow sharing system 108. The boost pump 112 supplies fuel at a low source pressure Pb that is divided into two low pressure fuel supply lines, indicated at 116, 118, respectively, to supply fuel to the main fuel supply loop 104, actuation supply loop 106 and pump flow sharing system 108, respectively. A low pressure fuel return line returns excess fuel flow from the main fuel supply loop 104 and the pump flow sharing system 108 back to supply lines 116, 118. The boost pump 112 can be, for example, a centrifugal pump to provide fuel at a sufficient pressure to the various downstream systems. Note that fluid flow is indicated by directional arrows as provided in FIG. 1. It will be appreciated that the lines 116, 118, 120 may each include at least one check valve, heat exchanger and/or fuel filter (not shown), as will also be well known to those skilled in the art.

The main fuel supply loop 104 generally includes a main pump 122 which is typically a fixed, positive displacement pump that provides fuel to the engine during normal or steady state operating conditions. The main pump 122 includes a main pump inlet 124 that is supplied fluid at supply pressure Pb by fuel supply line 116. The main pump 122 also includes a main pump outlet 126 in fluid communication with a high pressure outlet line 128 that supplies high pressure fluid at the required flow rate and at a main pump discharge pressure Ps1, to the pump flow sharing system 108. The main pump 122 may also have a pressure relief line 130 including a high-pressure relief valve 132 that operatively connects the main pump outlet 126 with the main pump inlet 124 to control the maximum pressure supplied by the main fuel supply loop 104.

The main pump 122 is preferably sufficiently sized to meet engine burn flow demands ranging from above windmill through cruise conditions. Accordingly, it will be appreciated that because the main pump 122 is sized to deliver fuel at a rate that more closely matches engine demand during steady state normal engine conditions, the amount of high pressure bypass/recirculated flow is minimized. By sizing the main pump 122 in this manner, the excess flow capacity needed for maximum or high engine fuel flow conditions has been shifted to the actuation supply loop 106 and until the flow is needed. As will be appreciated, the main pump 122 is of sufficient size to meet the pressure and flow requirements during these engine steady state operating conditions, yet it need not be sized to generate the flow required to meet windmill relight or high flow conditions and/or meet the pressure and flow requirements of the actuation system. As such, the main pump 122 raises less flow in excess of engine flow demand to high pressure for normal operating conditions resulting in reduced heat generation during these operating conditions. This allows for smaller heat exchangers to be implemented within the fuel flow system.

The actuation supply loop 106 provides high pressure fluid to auxiliary engine components, but also during high flow demands to the engine. The high pressure fluid of the actuation supply loop 106 can be combined/integrated with the fuel of the main fuel supply loop 104 using pump flow sharing system 108 to provide sufficient fuel to the engine during maximum fuel demand operations.

The actuation supply loop 106 includes the low pressure fuel supply line 118 in fluid communication with an actuation pump inlet 140 of the actuation pump 142. The actuation pump 142 in this embodiment is a positive fixed displacement actuation pump. Fuel at an actuation pump discharge pressure Ps2 (also referred to as an actuation pump outlet pressure) exits actuation pump 142 at actuation pump outlet 144 and is delivered through high pressure outlet line 146 at the required pressure and flow rate to the actuator supply line 148. Although not shown, the actuator supply line 148 can incorporate a minimum pressure valve, bypass valve, filters and the like, as will be appreciated by those skilled in the art.

A bypass line 160 including a high pressure relief valve 162 operatively fluidly communicates the actuation pump outlet 144 with the actuation pump inlet 140 to control the maximum actuation pump discharge pressure Ps2 supplied by the actuation supply loop 106.

As will be more fully described below, the actuation pump 142 is pressure regulated using the actuation pump's own discharge pressure, actuation pump discharge pressure Ps2 and fluid flow. This allows the actuation pump discharge pressure Ps2 to be set and regulated independent of external parameters such as main pump discharge pressure Ps1, such as in past pump arrangements. By avoiding dependency on main pump discharge pressure Ps1 for regulating actuation pump discharge pressure Ps2, the regulation of actuation pump discharge pressure Ps2 avoids the need to know the parameters affecting Ps1 such as engine speed, CDP, and flow split. Further, prior to flow sharing between the main fuel supply loop 104 and actuation supply loop 106, the actuation pump discharge pressure Ps2 must be increased near the main pump discharge pressure Ps1 to minimize switching transient. To do this when using main pump discharge pressure Ps1 as the regulating pressure, the parameters relating to going to the flow sharing configuration must be known. The present arrangement avoids requiring knowledge of parameters relating to main pump discharge pressure Ps1 in controlling the actuation pump discharge pressure Ps2.

However, the pressure regulation of the actuation pump 142 may be overridden in the event that pump flow sharing is required thereby driving the actuation pump discharge pressure Ps2 to or above the main pump discharge pressure Ps1 (also referred to as main pump outlet pressure Ps1), as will be more fully described below.

The actuation supply loop 106 includes a pressure regulator 164. The pressure regulator 164 generally includes a pressure regulating valve 166 and a control valve 168.

The pressure regulating valve 166 includes a pressure regulating chamber 170 that regulates the actuation pump discharge pressure Ps2. A regulator valve member 172 interacts with first, second and third ports 173, 179, 182 of the pressure regulating chamber 170 to regulate actuation pump discharge pressure Ps2. First port 173 is in operative fluid communication with the actuation pump outlet 144 via high pressure outlet line 146 and high pressure inlet line 174. High pressure fluid at actuation pump discharge pressure Ps2 passes through these lines 146, 174 and acts on a first end portion 176 of regulator valve member 172 and acts to bias regulator valve member 172 in a first displacement direction illustrated generally by arrow 178. The amount of biasing along first displacement direction is equivalent to pump discharge pressure Ps2 multiplied by the effective surface area of first end portion 176. The effective surface area of the first end portion is the amount of surface area equivalent to a surface normal to first displacement direction 178.

The second port 179 of pressure regulating chamber 170 is in operative fluid communication with the actuation pump inlet 140, or other low pressure source, via low pressure outlet line 180 and supply line 118 and is therefore at supply pressure Pb. The first and second ports 173, 179 operatively selectively communicate through pressure regulating chamber 170.

Valve member 172 operably adjusts the size of the flow path between first and second ports 173 and 179. In one embodiment, valve member 172 adjusts the size of second port 179 to adjust the amount of flow restriction provided by the regulator valve 166 and particularly second port 179. Variation in the amount of flow restriction adjusts the actuation pump discharge pressure Ps2 at the actuator pump outlet 144 and in high pressure outlet line 146.

When the flow path through the regulator valve 166 is reduced, flow restriction is increased. However, because fluid flow through the pressure regulating chamber 170 from first port 173 to second port 179 remains substantially constant, increased flow restriction causes an increase in fluid pressure, and particularly actuation pump discharge pressure Ps2. Similarly When the flow path through the regulator valve 166 is increased, flow restriction is decreased. Due to the substantially constant fluid flow through the pressure regulating chamber 170 from first port 173 to second port 179, decreased flow restriction causes a decrease in fluid pressure, and particularly actuation pump discharge pressure Ps2.

Additionally, third port 182 of pressure regulating chamber 170 is sealed off from the first and second ports 173, 179 by regulator valve member 172. The third port 182 operatively fluidly communicates with actuation pump outlet 144 via regulator line 184, which is coupled to high pressure outlet line 146 at junction 186. The fluid at third port 182 acts on a second end portion 188 of the regulator valve member 172 biasing regulator valve member 172 in a second displacement direction 190, opposite the first displacement direction 178. Typically, the fluid in line 184 downstream from flow restriction 193 is at an intermediate pressure Pz due to a pressure drop caused by flow restriction 193. This fluid within regulator line 184 downstream from flow restriction 193 may also be referred to as "intermediate flow Pz." The fluid within regulator line 184 upstream from flow restriction 193 is maintained at actuation pump discharge pressure Ps2.

When the regulator valve member 172 is biased towards first port 173, the flow path between first and second ports 173, 179 is reduced increasing the flow restriction causing an increase in pump actuation discharge pressure Ps2. The opposite is true when regulator valve member 172 is biased towards third port 182.

While it is contemplated that a single diameter regulator valve member could be implemented, the illustrated regulator valve member 172 is a double diameter valve member such that first end portion 176 has a larger effective surface area than second end portion 188. This arrangement causes the force balance generated by applying pump actuation pressure Ps2 to the first end portion 176 and a flow at or below pump actuation pressure Ps2, alternatively Pz to the second end portion 188 to tend to bias regulator valve member 172 toward third port 182. However, the pressure regulating valve 166 includes a biasing spring 192 that assists in biasing regulator valve member 172 in the second displacement direction 190. It should be noted that in the illustrated and preferred embodiments fluid at supply pressure Pb is supplied to the differential area 189 between the first and second end portions 176, 188. This generates an additional force on the regulator valve member 172 that must be considered in the force balance acting on regulator valve member 172.

The biasing spring 192 is sized relative to the differential effective area between the first and second end portions 176, 188 such that the forces applied to the regulator valve member 172 are balanced at a maximum desired actuation pump outlet pressure Ps2. The following is a hypothetical and simplified example and ignores effects of supply pressure Pb acting on differential area 189 as well as other frictional forces or fluid leakage that may be present illustrating the effects of the various pressures on regulator valve member 172. It also assumes Pz is equal to Ps2. If the maximum desired actuation pump discharge pressure Ps2 is 1200 psi, the differential effective area between the first and second end portions 176, 188 may be 0.1 when using a 120 pound spring. Thus, when actuation pump discharge pressure reaches 1200 psi, the forces acting on regulator valve member 172 are balanced.

This double diameter arrangement prevents actuation pump discharge pressure Ps2 from building to infinity because, when actuation pump discharge pressure Ps2 exceeds the desired maximum value, the force balance on the regulator valve member 172 will result in a net force acting along the first displacement direction 178 causing the actuation pump discharge pressure Ps2 to drop down below the maximum desired value. For example, referring to the previous double diameter arrangement, if actuation pump discharge pressure Ps2 is 1300 psi, the net force applied to regulator valve member 172 by actuation pump discharge pressure Ps2 alone would be a net value of 130 pounds due to the ratio of 0.1 along the first displacement direction. Biasing spring 192 would only apply a force of 120 pounds along the second displacement direction 190 resulting in an overall net force of 10 pounds acting on regulator valve member 172 in the first displacement direction 178 causing regulator valve member 172 to open the flow path between first and second ports 173 and reduce the flow restriction therethrough causing a reduction in actuation pump discharge pressure Ps2.

Similarly, assuming it is desired to drive actuation pump discharge pressure Ps2 to its maximum value when actuation pump discharge pressure Ps2 is below the maximum desired pressure, such as below 1200 psi in the previous examples, a net force will act in the second displacement direction tending to cause the regulator valve member to reduce the size of the flow path between the first and second ports 173, 179 increasing flow restriction driving actuation pump discharge pressure Ps2 to a higher value. However, if actuation pump discharge pressure Ps2 were to exceed 1200 psi, for example back to 1300 psi, the regulator valve member 172 would be back in the original state and be driven back along displacement direction 178 to prevent the actuation pump discharge pressure Ps2 to be driven to infinite.

To control the net forces on regulator valve member 172, control valve 168 is interposed, via bleed line 194, between actuation pump outlet 144 and third port 182. Control valve 168 regulates the amount of actuation discharge pressure Ps2, and in most situations intermediate pressure Pz, that is applied to second end portion 188. Fluid in regulator line 184 may be selectively bled off through control valve 168 to reduce the pressure applied by the fluid at third port 182 to second end portion 188 below Ps2 to adjust the position of the regulator valve member 172 relative to first port 173. As the intermediate pressure Pz applied to second end portion 188 drops due to reduced restriction by control valve 168, regulator valve member 172 will be biased along first displacement direction 178 opening pressure regulating valve 166 reducing the flow restriction on the flow through the regulator valve chamber 170 between first and second ports 173, 179, as discussed above, causing actuation pump discharge pressure Ps2 to drop.

Bleed line 194 and regulator line 184 operatively fluidly communicate third port 182 with a control valve inlet illustrated in the form of an orifice 195 of control valve 168. The more fluid that is bled from regulator line 184 through bleed line 194, and consequently away from third port 182, and/or the less restriction applied thereto, the lower the pressure applied to second end portion 188 will be regulated. The control valve 168 includes a control valve member 196 that cooperates with orifice 195 to regulate the amount of fluid that is bled from regulator line 184 and/or the pressure thereof. Alternatively, it may be viewed that the valve member 196 increases or decreases the flow restriction through control valve 168 to adjust the pressure applied to second end portion 188, much like the discussion of adjusting the flow path between first and second ports 173, 179 above.

Control valve 168 is preferably an electro-hydraulic servo valve (EHSV) such that the actuation pump discharge pressure Ps2 (or intermediate pressure Pz) applied to the second end portion 188 can be electronically regulated. However, control valve 168 could take on other forms. By using the arrangement of a control valve 168 to control the regulating valve 166, the actuation pump discharge pressure Ps2 can be controlled independent of the main pump outlet pressure Ps1 of the main pump 122. Further, actuation pump discharge pressure Ps2 can be increased to the maximum regulated setting regardless of the engine operating conditions, as discussed previously. In some instances, this may be important for adding heat to the system to eliminate additional heat exchangers to add heat to the fuel in low temperature conditions by driving actuation pump discharge pressure Ps2 to a maximum, even when not needed, to input more energy into the fluid passing through actuation pump 142.

Control pressure line 197 operatively couples control valve outlet 198 to a control pressure source, illustrated as the pump flow sharing system 108 in this embodiment to provide a control or reference pressure (used interchangeably herein) to control the pressure applied to second end portion 188.

In a first configuration, the pump flow sharing system 108 is switched to a isolation configuration where main fuel supply loop 104 is separated or isolated from actuation supply loop 106, i.e. a non-flow sharing configuration. In this configuration, pump flow sharing system 108 operatively fluidly couples control pressure line 197 with return line 120 such that the control pressure is supply pressure Pb. Thus, intermediate pressure Pz downstream of flow restriction 193 in regulator line 184 can be selectively bled away from the third port 182 to adjust the position of the regulator valve member 172. Adjustment of the position of regulator valve member 172 adjusts actuation pump discharge pressure Ps2 to a lower value by reducing the fluid restriction at second port 179 to adjust the pressure of the fluid flowing from high pressure outlet line 146 through the regulating valve 166, and particularly from first port 173 to second port 179, back to the actuator pump inlet 140 or other low pressure fluid source. The amount of fluid that is bled through control valve 168 can be regulated by control valve 168, and particularly the interaction between orifice 195 and control valve member 196, to adjust the actuation pump discharge pressure Ps2. Thus, the adjustment of actuation pump discharge pressure Ps2 is regulated by supplying a portion of the actuation pump's own fluid discharge flow to the regulating valve 166 and can be wholly independent of main pump discharge pressure Ps1, as well as any other engine operating conditions of the engine or main fuel supply loop 104. Further, by inclusion of control valve 168, the actuation pump discharge pressure Ps2 is variable.

This first configuration occurs when the engine is operating at normal or steady state operations and when the actuator supply loop 106 is isolated from the main fuel supply loop 104, in other words, when fuel is not supplied to provide for burn flow or to supplement the main pump by the actuator supply loop 106.

When the engine requires more burn flow to the combustor than can be supplied strictly by the main supply loop 104, the pump flow sharing system 108 will switch to a flow sharing configuration in which the pump flow sharing system 108 operatively integrates/combines the outputs of the actuator supply loop 106 and the main supply loop 104 and feeds both of these fuel supplies to supply for burn flow to the combustor. This configuration is illustrated in a schematic form in FIG. 2.

Figure 2:
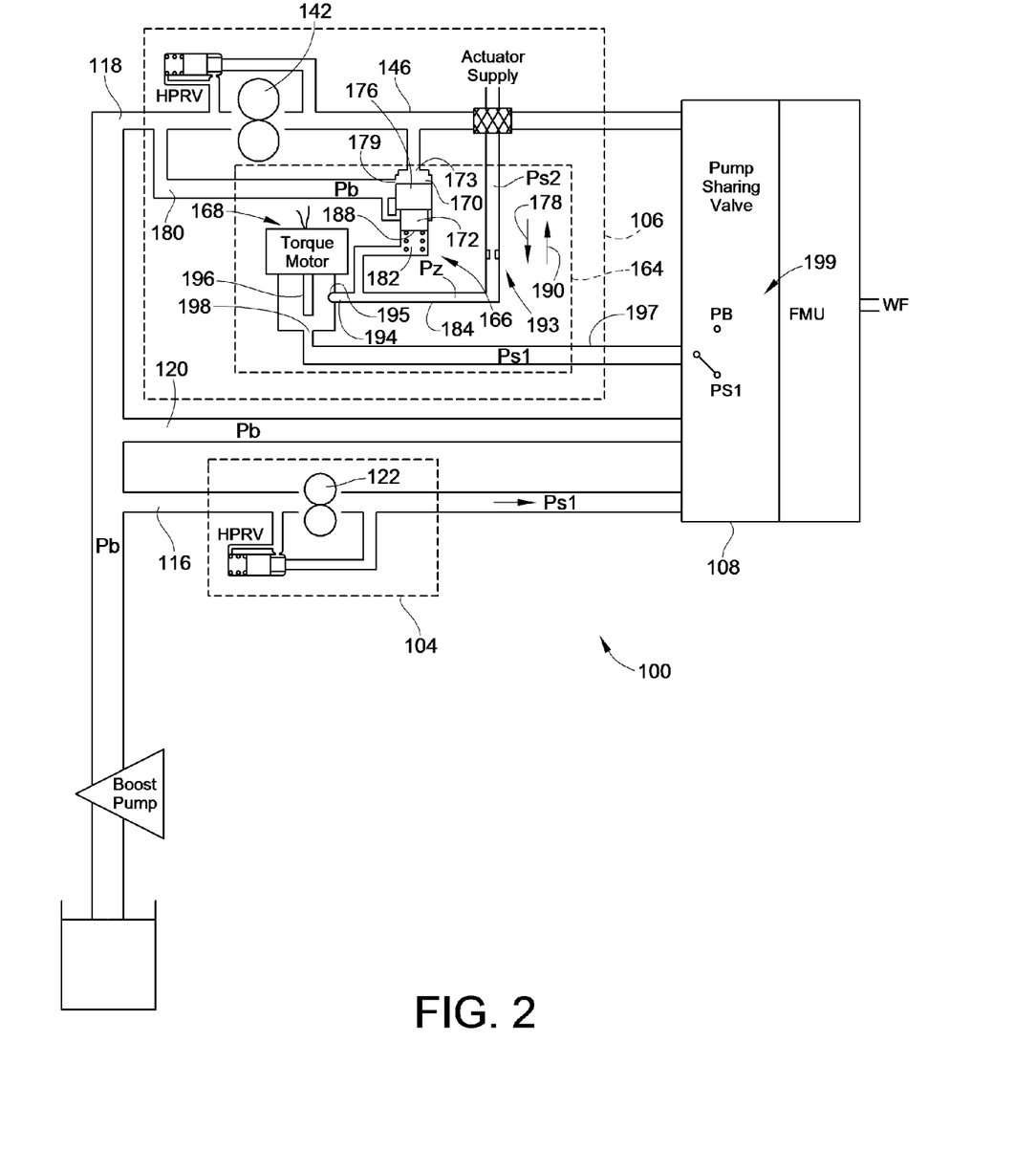
FIG. 2 is a simplified schematic representation of the fuel pump arrangement of FIG. 1 in a flow sharing mode.

Because the main pump discharge pressure Ps1 of the main pump 122 of the main supply loop 104 will typically vary from the actuation pump discharge pressure Ps2 of the actuation pump 142, the actuation pump discharge pressure Ps2 must be regulated to be at least as high as main pump discharge pressure Ps1. In one embodiment, during normal operation, actuation pump discharge pressure Ps2 is maintained at a lower pressure than main pump discharge pressure Ps1. Thus, actuation pump discharge pressure Ps2 must be raised at or above main pump discharge pressure Ps1.

To drive actuation pump discharge pressure Ps2 to main pump discharge pressure Ps1 or a predetermined value thereabove, the pump flow sharing system 108 will provide a pressure regulator override signal to the actuation supply loop 106 driving actuation pump discharge pressure Ps2 to or above main pump discharge pressure Ps1.

To send the override signal, the pump flow sharing system 108 will switch the control pressure or reference pressure exposed to control valve 168 and more particularly control valve outlet 198 to main pump discharge pressure Ps1 such that the minimum pressure that can be exposed to second end portion 188 of the regulator valve member 172 is main pump discharge pressure Ps1. In the second configuration, the pump flow sharing system 108 disconnects control pressure line 197 from supply line 120, which is at pressure Pb, and operatively connects the control pressure line 197 with high pressure outlet line 128 (identified in FIG. 1), which is at main pump discharge pressure Ps1. This is schematically represented by a change in state of switch 199 of the pump flow sharing system 108.

When main pump discharge pressure Ps1 is greater than actuation pump discharge pressure Ps2, and consequently intermediate pressure Pz, and control valve 168 is open, no fluid or at least less fluid will be bled from regulator line 184 until actuation pump discharge pressure Ps2 becomes greater than main pump discharge pressure Ps1. This will cause the force acting on second end portion 188 by the fluid in third port 182 at intermediate pressure Pz, which consequently will approach Ps1, and the biasing member, i.e. biasing spring 192, to be greater than the force acting on first end portion 176, causing the regulating valve 166 to close down driving actuation pump discharge pressure Ps2 to a higher value.

Fluid flowing through high pressure outlet line 146 from the actuation pump 142 will be fed into the pump flow sharing system 108 and operably combined/integrated with fluid flowing through outlet line 128 to meet the increased burn flow demands of the engine.

In one implementation, for example, the main pump 122 is sized to provide about 20% of the combined pump flow capability, while the actuation pump 142 provides about 80% of the combined flow capability. The combined flow from the two pumps is sufficient to meet the engine flow demand for windmill relight and maximum flow conditions required by the engine.

For certain other applications, the main pump 122 can be sized to supply engine burn flow for windmill start and/or other conditions beyond cruise. For certain other applications, the main pump 122 can also be sized to supply flow for engine functions other than engine fuel flow, such as providing flow to at least a portion of the engine's actuators, valves and other hydraulic systems, as will be appreciated by those skilled in the art. As such, the about 80/20 flow division between the two pumps is merely one example of the type of flow sharing or division contemplated by the present invention. Preferably, however, to minimize heat dissipation to the fuel stream, the actuation pump 142 of the fuel pump arrangement 100 is sized to provide a larger portion of the additional engine flow demand during windmill relight and maximum flow conditions than the main pump 122. This prevents over sizing of the main pump 122 causing excess heat production during steady state operation. Further, other ratios are contemplated.

Figure 3:
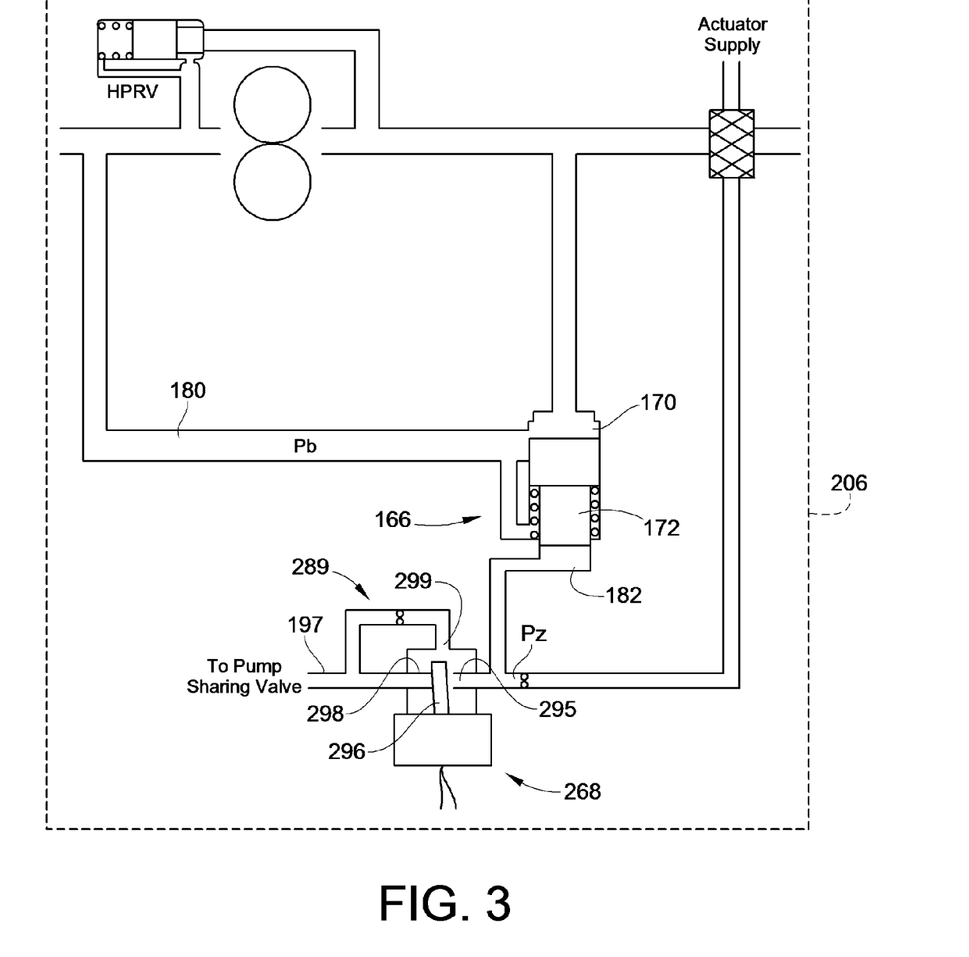
FIG. 3 is a partial simplified schematic representation of an alternative actuation pump arrangement according to the teachings of the present invention that utilizes a three position control valve.

FIG. 3 is a schematic representation of an alternative embodiment of an actuation supply loop 206 that may be incorporated into a pump arrangement similar to the previous embodiment. This actuation supply loop 206 is substantially similar to actuation supply loop 106 of the previous embodiment and only those features that are different therefrom will be focused on in the following description.

The primary difference in this embodiment is the configuration of the control valve 268. In this embodiment, the control valve 268 is a three position valve having a control valve member 296 that cooperates with a control valve inlet 295 and first and second control valve outlets 298, 299 to adjust the pressure that is applied to the third inlet 182 of the regulating chamber 170 to adjust the position of the regulator valve member 172. Typically, this control valve 268, and particularly control valve member 296, will be adjusted between three different positions to provide three different discrete conditions, as will be outlined more fully below.

Both of the first and second control valve outlets 298, 299 are operatively coupled to control pressure line 197.

In one orientation, the control valve member 296 is positioned to open first control valve outlet 298. In this orientation, the control or reference pressure of the control valve 268 is either main pump discharge pressure Ps1 or supply pressure Pb, depending on the configuration of the pump flow sharing system, i.e. if the pump flow sharing system is in a flow sharing configuration or a pump isolation configuration.

In a second orientation and as illustrated in FIG. 3, the control valve member 296 is positioned to close off the first control valve outlet 298. In this orientation, the control or reference pressure for the control valve 268 is provided via the second control valve outlet 299. Unlike the first control valve outlet 298, the second control valve outlet 299 has a flow restriction 289 interposed between it and the control pressure source connected to control pressure line 197. This restriction 289 provides the second control valve outlet 299 with a higher reference pressure than that which is provided by first control valve outlet 298. This may be beneficial where it is desired to maintain a control pressure at an intermediate pressure above supply pressure Pb. In one implementation, the restriction 289 maintains the pressure at second control valve outlet 299 at a pressure between that of supply pressure Pb and actuation pump discharge pressure Ps2, when the pressure in control pressure line 197 is at supply pressure Pb, i.e. when the pump flow sharing system is in the first configuration in which the main supply loop 104 and actuation supply loop 106 are isolated from one another, as described previously.

However, once again, if the pump flow sharing system where to switch to the second configuration, i.e. the flow sharing configuration, control pressure line 197 would be switched to main pump discharge pressure Ps1 which is typically greater than the minimum pressure maintained by restriction 289. Thus, restriction 289 would be substantially inconsequential in the flow sharing configuration, such that the override signal would be followed and actuation pump discharge pressure Ps2 would be raised, as outlined above.

In a third orientation, the control valve member 296 closes off control valve inlet 295, which will substantially prevent flow through the control valve 268 driving intermediate pressure Pz to actuation pump discharge pressure Ps2 and driving actuation pump discharge pressure Ps2 to a maximum value.

Figure 4:
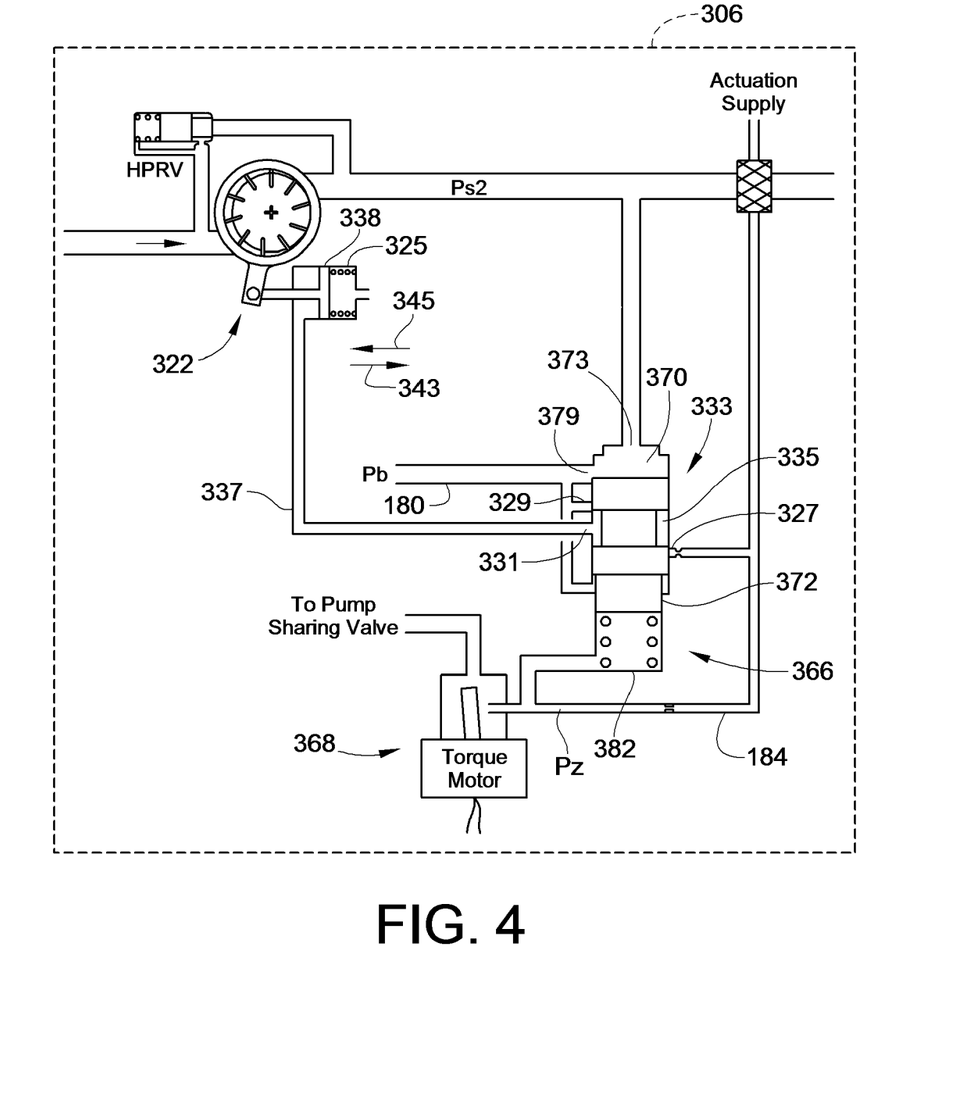
FIGS. 4 and 5 are partial simplified schematic representation of alternative actuation pump arrangements according to the teachings of the present invention that utilizes a variable displacement actuation pump.

FIG. 4 is a schematic representation of an alternative embodiment of an actuation supply loop 306 according to the teachings of the present invention. This actuation supply loop 306 can be incorporated into a flow sharing arrangement as illustrated in FIG. 1. This embodiment illustrates that the pressure regulating features of the previous embodiments, namely using the actuation pump discharge pressure to regulate the actuation pump, can be used on variable displacement pumps. Typically, but not always, for these type of arrangements, to increase actuation pump discharge pressure Ps2, pump displacement is increased and to decrease actuation pump discharge pressure Ps2, pump displacement is decreased.

In this embodiment, actuation pump 322 is a variable displacement pump. The pressure regulating valve 366 is configured to regulate both the actuation pump discharge pressure Ps2 of the actuation pump 322 as well as the pressure applied to the displacement controller 325 to adjust the actuation pump displacement, partly because, as identified above, to regulate pressure displacement is typically increased or decreased in a variable displacement system.

In this embodiment, the pressure regulating chamber 370 includes the first, second and third ports 373, 379, 382, as discussed previously, for regulating the actuation pump discharge pressure Ps2 and that provide one portion of a flow that drives the regulator valve member 372 in the first direction. The pressure regulating chamber 370 further includes three more ports including first, second and third displacement regulating ports 327, 329 and 331 for regulating the displacement of actuation pump 322.

The first displacement regulating port 327 is operably coupled to regulator line 184 by a supply line such that pressure below actuation pump discharge pressure Ps2 of the actuation pump 322, due to the restriction illustrated therein, is applied to the first displacement regulating port 327. However, the pressure may be at actuation pump discharge pressure Ps2. The second displacement regulating port 329 is operably coupled to low pressure outlet line 180 at supply pressure Pb. The third displacement regulating port 331 is operably coupled to a displacement controller line 337 that is coupled to the displacement controller 325. A second stage portion 333 (also known as an integrating stage) of the regulator valve member 372 selectively interacts with the displacement regulating ports 327, 329, 331 to operably couple either the first displacement regulating port 327, the second displacement regulating port 329 or neither of the first or second displacement regulating ports 327, 329 with the third displacement regulating port 331 to control displacement controller 325. By controlling displacement controller 325, the displacement of actuation pump 322 can be adjusted to increase or decrease displacement and fluid flow and consequently increase and decrease actuation pump outlet pressure Ps2, respectively.

Regulator valve member 372 will have a desired null position in which the valve member 372 desires to be. As such, the valve member 372 tries to maintain second port 379 at a nearly constant opening at steady state conditions. Thus, if actuation pump outlet pressure or pump displacement increases or decreases causing regulator valve member 372 to move from the null position, the pressure regulator valve 366 and particularly regulator valve member 372 will tend to drive the system such that regulator valve member 372 transitions back toward the null position.

In a first position of the regulator valve member 372, the first and second displacement regulating ports 327, 329 are closed and not coupled to the third displacement regulating port 331. Most typically, this position is the null position and occurs when the regulating valve 366 is in a steady state position. It should be noted that in this position ports 327, 329 may not in fact be closed such that no flow passes therethrough. Some leakage is permitted and may occur.

To decrease actuation pump outlet pressure Ps2, the displacement of actuation pump 322 must be decreased. To decrease the output of actuation pump 322, displacement controller 325 must be adjusted. To adjust displacement controller 325, the regulator valve member must move to a second position. In the second position, the regulator valve member 372 has been moved toward third port 382 and away from first port 373 such that the cavity 335 formed by the second stage 333 of the regulator valve member 372 couples the first displacement regulating port 327 with the third displacement regulating port 331 to increase the pressure in displacement controller line 337 to cause piston 338 of the displacement controller 325 to compress the biasing member therein, as illustrated by arrow 343, and decrease the displacement of actuation pump 322. In this arrangement, flow through first displacement regulating port 327 is increased increasing pressure within displacement controller line 337 as some fluid is permitted to flow into controller line 337.

The adjustment of the position of the regulator valve member 372 is effectuated, much like the previous embodiments. More particularly, the pressure control valve 368 decreases the amount of pressure applied to the regulator valve member 372 at third port 382 such that the force balance acting on valve member 372 drives the valve member 372 toward third port 382.

As noted above, as the pump displacement of actuation pump 322 decreases, the amount of flow through from the actuation pump 322 will decrease. Similarly, the amount of flow through regulator valve chamber 370 between first and second ports 373 and 379 will decrease thereby reducing the pressure acting on valve member by that fluid flow causing the regulator valve member 372 to transition back towards first port 373. This also causes the regulator valve member 372 to be transitioned back towards the null position.

As the regulator valve member 372 transitions back towards the null position, the regulator valve member 372 begins to close first displacement regulating port 372, thereby maintaining the newly acquired increased pressure within displacement controller line 337 so as to maintain the new, lower, displacement setting for the actuation pump 322.

It should also be noted that as regulator valve member 372 transitions back toward first port 373, the spring force acting on regulator valve member 372 decreases so as to balance the decreased pressure acting on the opposed end of the regulator valve member 372 due to the decreased actuation pump outlet pressure Ps2. This then results in a force balance maintaining the regulator valve member 372 in a desired null position. Further, even though the flow rate has decreased, the size of the flow path between the first and second ports 373 and 379 decreases increasing restriction as the valve member 372 moves in the second direction and back to the null position, such as to the null restriction. This null restriction amount is substantially similar for most pump displacement values.

The opposite occurs to increase actuation pump discharge pressure Ps2. To increase actuation pump outlet pressure Ps2, the displacement of actuation pump 322 must be increased. To increase the output (i.e. displacement) of actuation pump 322, displacement controller 325 must be adjusted. To adjust displacement controller 325, the regulator valve member must move to a third position. In the third position, the regulator valve member 372 has been moved away from third port 382 and toward first port 373 such that the cavity 335 formed by the second stage 333 of the regulator valve member 372 couples the second displacement regulating port 329 with the third displacement regulating port 331 to decrease the pressure in displacement controller line 337 to cause piston 338 of the displacement controller 325 to allow the biasing member therein to expand, as illustrated by arrow 345, and increase the displacement of actuation pump 322. In this arrangement, flow out of displacement controller line 337 via third displacement regulating port 331 is permitted such that flow is drained to second displacement regulating port 329 to reduce the pressure within the displacement controller line 337.

This adjustment of the position of the regulator valve member 372 is effectuated, much like the previous embodiments. More particularly, the pressure control valve 368 increases the amount of pressure applied to the regulator valve member 372 at third port 382 such that the force balance acting on valve member 372 drives the valve member 372 toward first port 373.

As noted above, as the pump displacement of actuation pump 322 increases, the amount of flow through from the actuation pump 322 will increase. Similarly, the amount of flow through regulator valve chamber 370 between first and second ports 373 and 379 will increase thereby increasing the pressure acting on valve member 372 by that fluid flow causing the regulator valve member 372 to transition back towards third port 382. This also causes the regulator valve member 372 to be transitioned back towards the null position and provide the null restriction between ports 373 and 379.

As the regulator valve member 372 transitions back towards the null position, the regulator valve member 372 begins to close second displacement regulating port 329, thereby preventing fluid from being drained from displacement control line 337 to maintain the newly acquired decreased pressure within displacement controller line 337 so as to maintain the new, higher, displacement setting for the actuation pump 322.

It should also be noted that as regulator valve member 372 transitions back toward third port 382, the spring force acting on regulator valve member 372 increases so as to balance the increased pressure acting on the opposed end of the regulator valve member 372 due to the increased actuation pump outlet pressure Ps2. This then results in a force balance maintaining the regulator valve member 372 in a desired null position and the null value of restriction from port 373 to port 379

Figure 5:
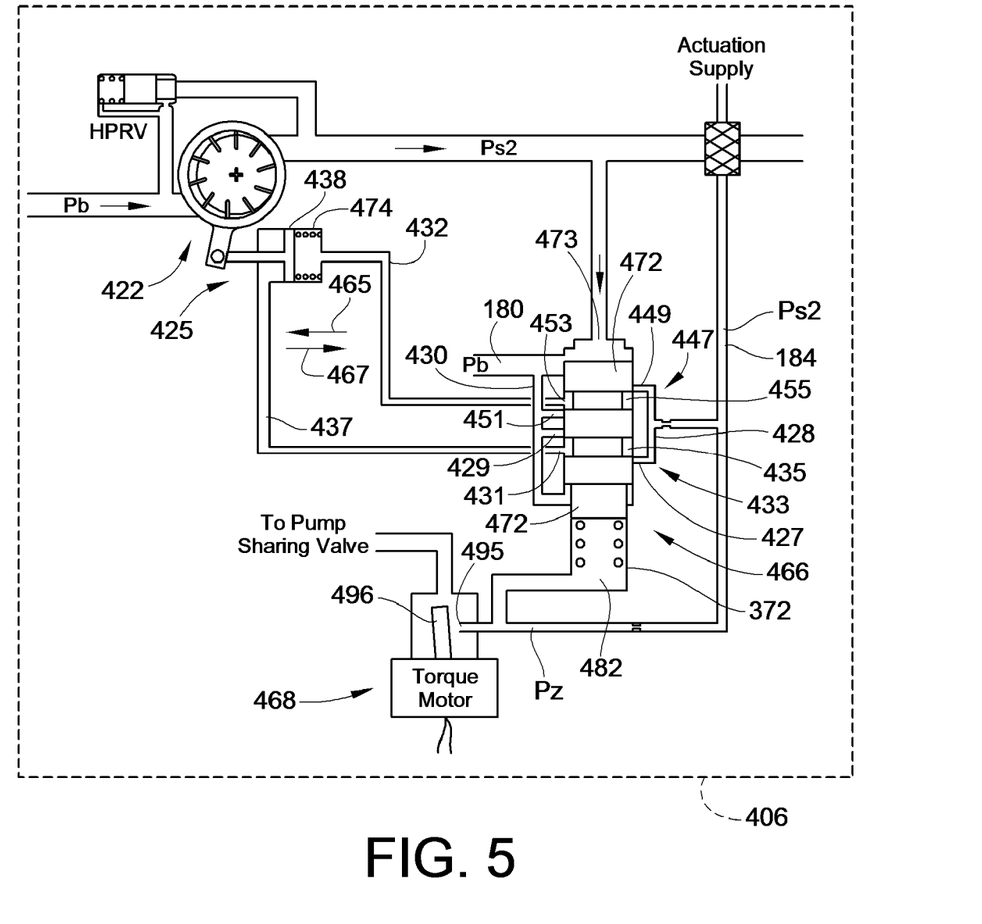

FIG. 5 is a schematic representation of an alternative embodiment of an actuation supply loop 406 according to the teachings of the present invention. This actuation supply loop 406 can be incorporated into a flow sharing arrangement as illustrated in FIG. 1. This embodiment is similar to the previous embodiment in that it includes a variable displacement actuation pump 422. This embodiment includes the ability to adjust the reference pressure used by the displacement controller 425 of the variable displacement actuation pump 422, rather than relying on a constant reference pressure source. This arrangement increases the gain and responsiveness of the system.

The regulator valve member 472 of this embodiment includes a second stage 433, that operates substantially identical to the second stage 333 of the previous embodiment to adjust the pressure within displacement controller line 437, as well as a third stage 447 for varying the reference pressure applied to the piston 438 of the displacement controller 425 in reference pressure line 432. More particularly, the regulating valve 466 includes, in addition to the ports of the previous embodiments, first, second and third reference pressure ports 449, 451, 453 for adjusting a reference pressure that is applied to piston 438. First reference pressure port 449 is operably coupled to actuation pump discharge pressure Ps2 provided by regulating line 184 via line 428. This pressure may be less than Ps2 due to potential flow restrictions therein. Second reference pressure port 451 is operably coupled to supply pressure Pb via line 430 operably coupled to low pressure outlet line 180. Third reference pressure port 453 is operably coupled to displacement control 425 by line 432 to provide a reference pressure for piston 438

The third stage 447 acts substantially similar to the second stage discussed with regard to the previous embodiment, but acts to adjust the reference pressure that is applied on the opposite side of piston 438 resulting in a different gain value than the previous embodiment.

In a first position, as illustrated in FIG. 5, the variable displacement actuation pump 422 is in a steady state displacement configuration such that the displacement setting of displacement controller 425 is in a steady state position. This is illustrated by the fact that the third reference pressure port 453 is coupled to neither of the first or second reference pressure ports 449, 451 by cavity 455 defined by the third stage 447. Also, the third displacement regulating port 431 is not operably coupled to either of the first or second displacement regulating ports 427 or 429. As such, the pressures within lines 432 and 437 are maintained at a constant value such that piston 438 is in an equilibrium position maintaining a constant displacement.

In a second position, the regulator valve member 472 moves away from third port 482 and toward first port 473. Typically, this will be done by control valve 468 signaling a desired increase in actuation pump discharge pressure Ps2 and/or a desired increase in the displacement of the actuation pump 422 as described in the previous embodiment. However, as will be explained in more detail below, not only will the pressure in displacement control line 437 change, the regulator valve member 472 will cause the pressure on the opposite side of piston 438 to change, opposite that of displacement control line 437, to increase responsiveness of the system.

In this second position, the cavity 455 formed by the third stage 447 of the regulator valve member 472 couples the first reference pressure port 449 with the third reference pressure port 453 to increase the pressure in reference pressure line 432 and the pressure exposed to the spring side of the piston 438 of the displacement controller 425. Also in this position, cavity 435 formed by the second stage 433 couples the second displacement regulating port 429 with the third displacement regulating port 431 to decrease the pressure in displacement controller line 437 exposed to the opposite side of piston 438. In this configuration, a high pressure is applied to the spring side of piston 438 and a low pressure is applied to the opposite side of piston 438. This will cause piston 438 to actuate in a direction illustrated by arrow 465 and adjust the displacement settings of actuation pump 422 resulting in an increase in pump displacement. It should be noted, that because force is being simultaneously increased on one side of the piston 438 and decreased on the other side of the piston 438, actuation of piston 438 is performed quicker than in the previous embodiment.

As the pump displacement of actuation pump 422 increases, the amount of flow through from the actuation pump 422 will increase. Similarly, the amount of flow through regulator valve chamber between first and second ports 473 and 479 will increase thereby increasing the pressure acting on valve member 472 by that fluid flow causing the regulator valve member 472 to transition back towards third port 482. This also causes the regulator valve member 472 to be transitioned back towards the steady state position.

As the regulator valve member 472 transitions back towards the steady state position, the regulator valve member 472 begins to close second displacement regulating port 429, thereby preventing fluid from being drained from displacement control line 437 to maintain the newly acquired decreased pressure within displacement controller line 437. Similarly, regulator valve member 472 begins to close first reference pressure port, thereby maintaining the newly acquired increased pressure within reference pressure line 432. With the regulator valve member 472 back at the steady state position, the new, higher, displacement setting for the actuation pump 422 is maintained.

It should also be noted that as regulator valve member 472 transitions back toward third port 482, spring force acting on the regulator valve member 472 increases so as to balance the increased pressure acting on the opposed end of the valve member 472 due to the increased actuation pump outlet pressure Ps2. This then results in a force balance maintaining the regulator valve member 472 in a desired steady state position.

In a third position, opposite the second, the regulator valve member 472 moves toward third port 482 and away from first port 473. In this third position, the cavity 455 formed by the third stage 447 of the regulator valve member 472 couples the second reference pressure port 451 with the third reference pressure port 453 to decrease the pressure in reference pressure line 432 and the pressure exposed to the spring side (i.e. reference side) of the piston 438 of the displacement controller 425. Also in this position, cavity 435 formed by the second stage 433 couples the first displacement regulating port 427 with the third displacement regulating port 431 to increase the pressure in displacement controller line 437 exposed to the opposite side of piston 438. In this configuration, a low pressure of is applied to the spring side of piston 438 and a high pressure is applied to the opposite side of piston 438. This will cause piston 438 to actuate in a direction illustrated by arrow 467 and adjust the displacement settings of actuation pump 422 resulting in an reduction in pump displacement. It should be noted, that because force is being simultaneously increased on one side of the piston 438 and decreased on the other side of the piston 438, actuation of piston 438 is performed quicker than in the previous embodiment.

As the pump displacement of actuation pump 422 decreases, the amount of flow through from the actuation pump 422 will decrease. Similarly, the amount of flow through regulator valve chamber between first and second ports 473 and 479 will decrease thereby decreasing the pressure acting on valve member 472 by that fluid flow causing the regulator valve member 472 to transition back towards first port 473. This also causes the regulator valve member 472 to be transitioned back towards the steady state position.

As the regulator valve member 472 transitions back towards the steady state position, the regulator valve member 472 begins to close first displacement regulating port 427 maintaining the newly acquired increased pressure within displacement controller line 437. Similarly, regulator valve member 472 begins to close second reference pressure port 451, thereby preventing fluid from being drained from reference pressure line 432 and maintaining the newly acquired decreased pressure within reference pressure line 432. With the regulator valve member 472 back at the steady state position, the new, lower, displacement setting for the actuation pump 422 is maintained.

It should also be noted that as regulator valve member 472 transitions back toward first port 473, spring force acting on the regulator valve member 472 decreases so as to balance the decreased pressure acting on the opposed end of the valve member 472 due to the decreased actuation pump outlet pressure Ps2.

Figure 6:
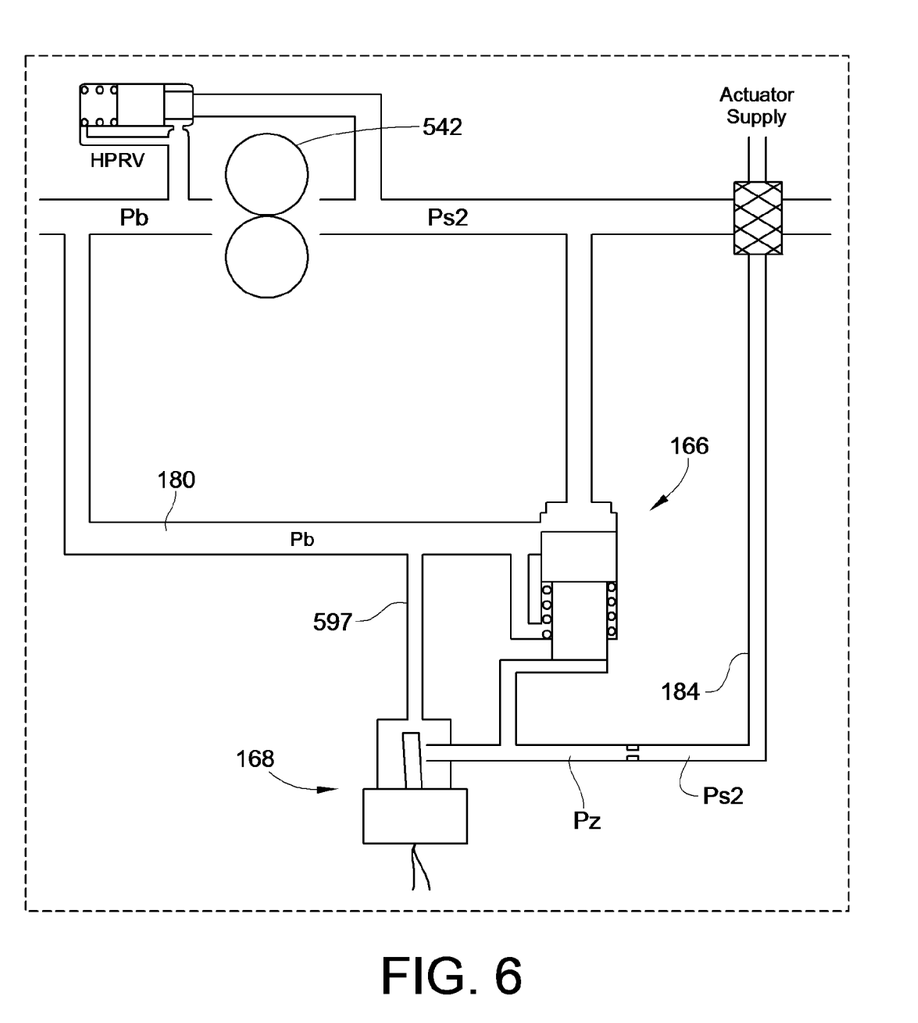
FIG. 6 is a further simplified schematic representation of an alternative actuation pump arrangement according to the teachings of the present invention.

FIG. 6 is a further embodiment of a pump arrangement according to the present invention. This is a simplified arrangement of the embodiment illustrated in FIG. 1. This arrangement is single pump arrangement that does not include a pump flow sharing valve to couple pump 542 with any other pumps. In this embodiment, the control pressure source is the supply provided by the supply pump having a supply pressure Pb. In this embodiment, control pressure line 597 is always coupled to a fuel source at supply pressure Pb. In the illustrated embodiment, control pressure line 597 is coupled to low pressure outlet line 180.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pump arrangement for a fuel system for use in an aircraft, the pump arrangement comprising:
   an actuation pump having an actuation pump outlet having an actuation pump discharge flow at an actuation pump discharge pressure;
   a pressure regulating valve comprising:
      first, second and third ports;
      a regulator valve member selectively adjusting a flow path from the first port to the second port;
      wherein the first port is operably fluidly coupled to the actuation pump outlet such that a first portion of the actuation pump discharge flow operably biases the regulator valve member in a first direction;
      wherein the third port is operably fluidly coupled to the actuation pump outlet such that a second portion of the actuation pump discharge flow operably biases the regulator valve member in a second direction opposite the first direction;
      wherein movement of the regulator valve in either of the first or second directions operably adjusts a pressure of the first portion of the actuation pump discharge flow to correspondingly adjust the actuation pump discharge pressure; and
   a control valve operably interposed between the actuation pump outlet and the third port selectively adjusting the amount of biasing applied by the second portion of the actuation pump discharge flow.

2. The pump arrangement of claim 1, wherein the control valve includes
   a control valve inlet operably fluidly communicating with the third port;
   a control valve outlet operably fluidly communicating with a control pressure source; and
   a control valve member interposed between the control valve inlet and the control valve outlet adjusting the amount of restriction between the control valve inlet and the control valve outlet to adjust the amount of biasing applied by the second portion of the actuation pump discharge flow.

3. The pump arrangement of claim 2, wherein control valve member controls the amount of the second portion of the actuation pump discharge flow that is permitted to flow to the control pressure source to adjust the amount of biasing applied by the second portion of the actuation pump discharge flow.

4. The pump arrangement of claim 3, wherein the control pressure source is operably fluidly coupled to a low pressure source.

5. A pump arrangement for a fuel system for use in an aircraft, the pump arrangement comprising:
   an actuation pump having an actuation pump outlet having an actuation pump discharge flow at an actuation pump discharge pressure;
   a pressure regulating valve comprising:
      first, second and third ports;
      a regular valve member selectively adjusting a flow path from the first port to the second port;
      wherein the first port is operably fluidly coupled to the actuation pump outlet such that a first portion of the actuation pump discharge flow operably biases the regulator valve member in a first direction;
      wherein the third port is operably fluidly coupled to the actuation pump outlet such that a second portion of the actuation pump discharge flow operably biases the regulator valve member in a second direction opposite the first direction;
      wherein movement of the regulator valve in either of the first or second directions operably adjusts a pressure of the first portion of the actuation pump discharge flow to correspondingly adjust the actuation pump discharge pressure;
   a control valve operably interposed between the actuation pump outlet and the third port selectively adjusting the amount of biasing applied by the second portion of the actuation pump discharge flow;
   wherein the control valve includes
      a control valve inlet operably fluidly communicating with the third port;
      a control valve outlet operably fluidly communicating with a control pressure source; and
      a control valve member interposed between the control valve inlet and the control valve outlet adjusting the amount of restriction between the control valve inlet and the control valve outlet to adjust the amount of biasing applied by the second portion of the actuation pump discharge flow;
   a sharing valve operably fluidly coupled to the actuation pump outlet;
   a main pump having a main pump outlet fluidly coupled to the sharing valve; and
   wherein the sharing valve is the control pressure source, and the sharing valve has a first pressure regulating configuration operably fluidly coupling the control valve outlet to a low pressure source and a second pressure regulating configuration operably fluidly coupling the control valve outlet to the main pump outlet.

6. The pump arrangement of claim 5, wherein the sharing valve has a first flow sharing configuration wherein the sharing valve operably combines the actuation pump discharge flow with a main pump discharge flow to provide a combined flow, and a second flow sharing configuration wherein the sharing valve operably isolates the actuation pump discharge flow from the main pump discharge flow.

7. The pump arrangement of claim 6, wherein the sharing valve is in the second pressure regulating configuration when the sharing valve is in the first flow sharing configuration.

8. The pump arrangement of claim 6, wherein the first portion of the actuation pump discharge flow acts on a first portion of the regulator valve member having a first effective surface area that is greater than a second effective surface area of a second portion of the regulator valve member upon which the second portion of the actuation pump discharge flow acts.

9. The pump arrangement of claim 8, wherein the first effective surface area is between about five percent and fifteen percent greater than the second effective area and further comprising a biasing member acting on the regulator valve member in the second direction, wherein the biasing member provides a biasing force of between about five percent and fifteen percent of a maximum actuation pump discharge pressure.

10. The pump arrangement of claim 9, further comprising a flow restriction interposed between the actuation pump outlet and the third port providing a pressure drop in the second portion of the actuation pump discharge pressure to an intermediate pressure, the control valve operably interposed between the flow restriction and the third port.

11. The pump arrangement of claim 9, wherein the actuation pump is a variable displacement pump and the pressure regulating valve operably controls a displacement controller coupled to the actuation pump;

the pressure regulating valve further comprising first, second and third displacement regulating ports, the first displacement regulating port operably coupled to the actuation pump discharge, the second displacement regulating port operably fluidly coupled to the low pressure source, the third displacement regulating port operably fluidly coupled to the displacement controller for providing a displacement control pressure that acts on a first side of a piston of the displacement controller for controlling the displacement controller due to changes in the displacement control pressure in the third displacement regulating port acting on the first side of the piston;

the regulator valve member movable between a first position wherein the regulator valve member operably couples the first displacement regulating port with the third displacement regulating port to increase the displacement control pressure, a second position wherein the regulator valve member operably couples the second displacement regulating port with the third displacement regulating port to decrease the displacement control pressure, and a third position wherein the regulator valve member does not couple the third displacement regulating port with either the first or second regulating ports so as to maintain a constant displacement control pressure acting on the first side of the piston; and wherein movement in the first direction reduces the actuation pump displacement and movement in the second direction increases the actuation pump displacement.

12. The pump arrangement of claim 11, wherein the pressure regulating valve further comprises first, second and third reference pressure ports, the first reference pressure port operably coupled to the actuation pump outlet, the second reference pressure port operably fluidly coupled to the low pressure source, the third reference pressure port operably fluidly coupled to the displacement controller for providing a reference pressure that acts on a second, opposite, side of the piston of the displacement controller opposing the force provided by the displacement control pressure acting on the first side of the piston;

the regulator valve member operably coupling the first reference pressure port with the third reference port to increase the reference pressure in the second position, the regulator valve member operably coupling the second displacement regulating port with the third displacement regulating port to decrease the reference pressure in the first position, and the regulator valve member does not couple the third reference pressure port with either the first or second reference pressure ports so as to maintain a constant reference pressure acting on the second side of the piston.

13. The pump arrangement of claim 12, wherein the first, second and third displacement regulating ports cooperate with a second stage of the regulator valve member and the first, second and third reference pressure ports cooperate with a third stage of the regulator valve member.

14. A pump arrangement for a fuel system for use in an aircraft, the pump arrangement comprising:

an actuation pump having an actuation pump outlet having an actuation pump discharge flow at an actuation pump discharge pressure;

a pressure regulating valve comprising:
first, second and third ports;
a regulator valve member selectively adjusting a flow path from the first port to the second port;
wherein the first port is operably fluidly coupled to the actuation pump outlet such that a first portion of the actuation pump discharge flow operably biases the regulator valve member in a first direction;
wherein the third port is operably fluidly coupled to the actuation pump outlet such that a second portion of the actuation pump discharge flow operably biases the regulator valve member in a second direction opposite the first direction;
wherein movement of the regulator valve in either of the first or second directions operably adjusts a pressure of the first portion of the actuation pump discharge flow to correspondingly adjust the actuation pump discharge pressure;

a control valve operably interposed between the actuation pump outlet and the third port selectively adjusting the amount of biasing applied by the second portion of the actuation pump discharge flow;
wherein the control valve includes
a control valve inlet operably fluidly communicating with the third port;
a control valve outlet operably fluidly communicating with a control pressure source; and
a control valve member interposed between the control valve inlet and the control valve outlet adjusting the amount of restriction between the control valve inlet and the control valve outlet to adjust the amount of biasing applied by the second portion of the actuation pump discharge flow;
wherein the control valve member controls the amount of the second portion of the actuation pump discharge flow that is permitted to flow to the control pressure source to adjust the amount of biasing applied the second portion of the actuation pump discharge flow; and
wherein the control valve is a three position valve movable between three discrete positions, the control valve including a second control valve outlet, the control valve having a first position preventing fluid communication between the control valve inlet and the first and second control valve outlets, a second position preventing fluid communication between the control valve inlet and the first control valve outlet and permitting fluid communication between the control valve inlet and the second control valve outlet and a third position permitting fluid communication between the control valve inlet and the first control valve outlet, the second control valve outlet being in fluid communication with the control pressure source and including a pressure increasing restriction to maintain a pressure at the control valve inlet at a higher pressure than that which would similarly be provided by the first control valve outlet.

15. The pump arrangement of claim 14, wherein the first portion of the actuation pump discharge flow acts on a first portion of the regulator valve member having a first effective surface area that is greater than a second effective surface area of a second portion of the regulator valve member upon which the second portion of the actuation pump discharge flow acts.

16. A pump arrangement for a fuel system for use in an aircraft, the pump arrangement comprising:

an actuation pump having an actuation pump outlet having an actuation pump discharge flow at an actuation pump discharge pressure;

a pressure regulating valve comprising:

first, second and third ports;

a regulator valve member selectively adjusting a flow path from the first port to the second port;

wherein the first port is operably fluidly coupled to the actuation pump outlet such that a first portion of the actuation pump discharge flow operably biases the regulator valve member in a first direction;

wherein the third port is operably fluidly coupled to the actuation pump outlet such that a second portion of the actuation pump discharge flow operably biases the regulator valve member in a second direction opposite the first direction;

wherein movement of the regulator valve in either of the first or second directions operably adjusts a pressure of the first portion of the actuation pump discharge flow to correspondingly adjust the actuation pump discharge pressure;

a control valve operably interposed between the actuation pump outlet and the third port selectively adjusting the amount of biasing applied by the second portion of the actuation pump discharge flow; and wherein the actuation pump is a fixed displacement pump and movement of the regulator valve member in the first direction decreases a flow restriction between the first and second ports to decrease the pressure of the first portion of the actuation pump discharge flow to reduce the actuation pump discharge pressure and movement of the regulator valve member in the second direction increases the flow restriction between the first and second ports to increase the pressure of the first portion of the actuation pump discharge flow to increase the actuation pump discharge pressure.

17. The pump arrangement of claim 16, wherein the actuation pump is a variable displacement pump and movement of the regulator valve member in the first direction operably decreases the amount of displacement of the actuation pump to reduce the actuation pump discharge pressure and movement of the regulator valve member in the second direction increases the amount of displacement of the actuation pump to increase the actuation pump discharge pressure.

18. The pump arrangement of claim 16, wherein the actuation pump is a variable displacement pump and the pressure regulating valve operably controls a displacement controller coupled to the actuation pump;

the pressure regulating valve further comprising first, second and third displacement regulating ports, the first displacement regulating port operably coupled to the actuation pump outlet, the second displacement regulating port operably fluidly coupled to a low pressure source, the third displacement regulating port operably fluidly coupled to the displacement controller for providing a displacement control pressure that acts on a first side of a piston of the displacement controller for controlling the displacement controller due to changes in the displacement control pressure in the third displacement regulating port acting on the first side of the piston;

the regulator valve member movable between a first position wherein the regulator valve member operably couples the first displacement regulating port with the third displacement regulating port to increase the displacement control pressure, a second position wherein the regulator valve member operably couples the second displacement regulating port with the third displacement regulating port to decrease the displacement control pressure, and a third position wherein the regulator valve member does not couple the third displacement regulating port with either the first or second regulating ports so as to maintain a constant displacement control pressure acting on the first side of the piston; and wherein movement in the first direction reduces the actuation pump displacement and movement in the second direction increases the actuation pump displacement.

19. The pump arrangement of claim 18, wherein the pressure regulating valve further comprises first, second and third reference pressure ports, the first reference pressure port operably coupled to the actuation pump outlet, the second reference pressure port operably fluidly coupled to the low pressure source, the third reference pressure port operably fluidly coupled to the displacement controller for providing a reference pressure that acts on a second, opposite, side of the piston of the displacement controller opposing the force provided by the displacement control pressure acting on the first side of the piston;

the regulator valve member operably coupling the first reference pressure port with the third reference port to increase the reference pressure in the second position, the regulator valve member operably coupling the second displacement regulating port with the third displacement regulating port to decrease the reference pressure in the first position, and the regulator valve member does not couple the third reference pressure port with either the first or second reference pressure ports so as to maintain a constant reference pressure acting on the second side of the piston.

20. A method of regulating an output of an actuation pump in a fuel system, the method comprising the steps of:

biasing a valve member in a first direction using the actuation pump discharge flow of an actuation pump by applying the actuation pump discharge flow to a first portion of the valve member;

biasing the valve member in a second direction, opposite the first direction, using the actuation pump discharge flow of the actuation pump by applying the actuation pump discharge flow to a second portion of the valve member; and selective adjusting the biasing in the second direction applied by the actuation pump discharge flow to the second portion of the valve member to transition the valve member in either the first or second directions;

wherein biasing of the valve member in the first direction operably reduces actuation pump discharge pressure and biasing of the valve member in the second direction operably increases actuation pump discharge pressure;

wherein the step of biasing in the first direction includes operatively applying a first portion of an actuation pump discharge flow to the first portion of the valve member and the step of biasing in the second direction includes operatively applying a second portion of the actuation pump discharge flow to the second portion of the valve member and wherein the step of selectively adjusting the amount of the actuation pump discharge pressure applied to the second portion of the valve member includes selectively adjusting a reference pressure applied to the second portion of the actuation pump discharge flow that biases the second portion of the valve member; and wherein transitioning of the valve member in the first direction increasingly opens a flow path through which the first portion of the actuation pump discharge flow passes between the actuation pump outlet and a low pressure source decreasing a flow restriction between the actuation pump outlet and the low pressure source thereby reducing the actuation pump discharge pressure and transitioning of the valve member in the second direction increasingly closes the flow path between the actuation pump discharge and the low pressure source increasing the flow restriction between the actuation pump discharge and the low pressure source thereby increasing the actuation pump discharge pressure.

21. The method of claim 20, wherein the fuel system further includes a main pump and a sharing valve, the sharing valve operably selectively coupling the actuation pump discharge flow with a main pump discharge flow to form a combined flow, wherein the step of adjusting the reference pressure applied to the second portion of the actuation pump discharge flow includes the step of switching between a low pressure source and a high pressure source at a main pump discharge pressure.

22. The method of claim 21, further including the step of adjusting the reference pressure by bleeding off a portion of the second portion of the actuation pump discharge flow to a low pressure source.

23. The method of claim 22, further comprising over-riding the low pressure source with a high pressure source to prevent bleeding off of the second portion of the actuation pump discharge flow to a pressure below the pressure of the high pressure source, and wherein the high pressure source is operatively provided by an output of a main pump of the fuel system.

24. The method of claim 23, further comprising the step of adjusting displacement of the actuation pump by transitioning the valve member in the first and second directions.

* * * * *